Jan. 27, 1959  D. A. NEUBRECH ET AL  2,871,370
HIGH SENSITIVITY EXPOSURE HEAD
Filed Sept. 10, 1957  2 Sheets-Sheet 1
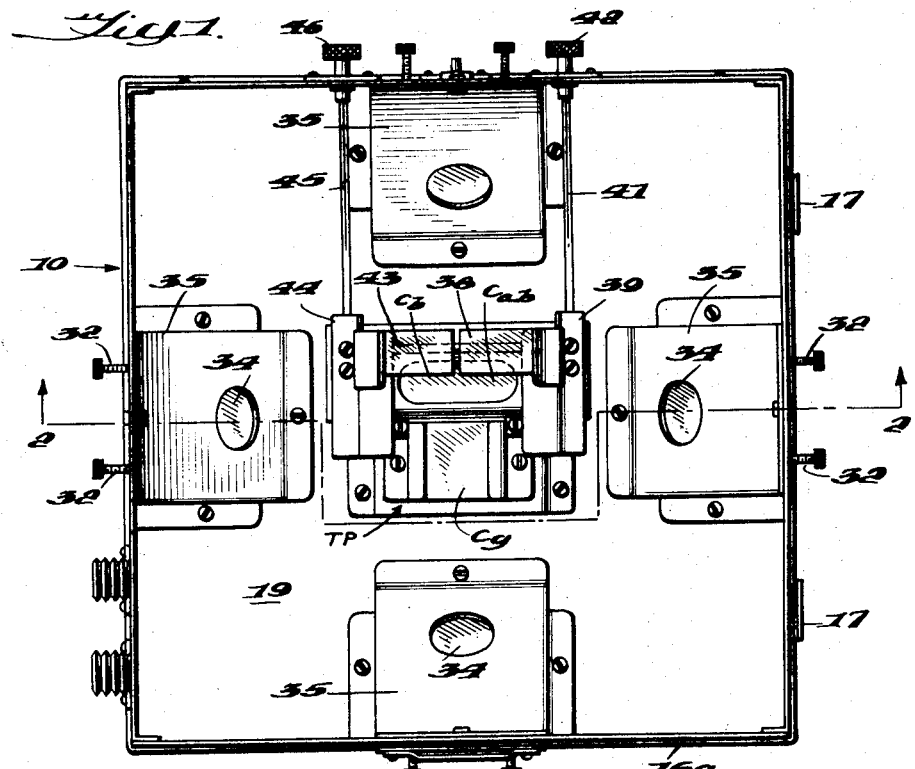
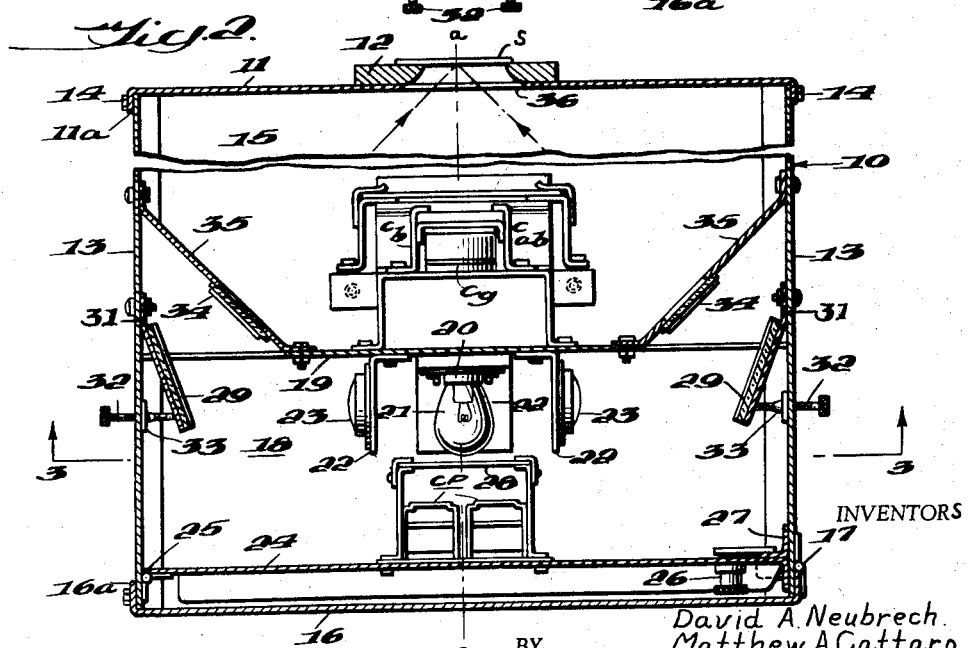
INVENTORS
David A. Neubrech
Matthew A. Cattaro
BY Pierce, Scheffler & Parker
ATTORNEYS INVENTORS
David A. Neubrech
Matthew A. Cattaro
BY Pierce, Scheffler & Parker
ATTORNEYS

United States Patent Office 2,871,370
Patented Jan. 27, 1959

2,871,370

HIGH SENSITIVITY EXPOSURE HEAD

David A. Neubrech, Takoma Park, Md., and Matthew A. Cattaro, Vienna, Va., assignors to Henry A. Gardner Laboratory, Inc., Bethesda, Md., a corporation of the District of Columbia Application September 10, 1957, Serial No. 683,181

8 Claims. (Cl. 250—220)

This invention relates to optical instruments of the photoelectric type for measuring the brightness or reflectance of a sample, and a tristimulus colorimeter or color difference meter for the direct measurement of three numerical values for the identification of a color by the coordinates of a color solid having scales of approximately uniform color-perception spacing.

Instruments of the above type include a component known as an "exposure head" which, in general, comprises a container in which is located a light source, a comparison photocell receiving light directly from the light source, means for supporting the sample to be measured, "test" photocells provided with the proper filters and optical means for reflecting light from the source to the sample and for directing diffused light from the sample onto the test cells. The electrical outputs of the comparison and test photocells are connected in circuits which evaluate the photocell response.

An instrument operating in accordance with the above principles to determine color and color difference is disclosed in United States Patent No. 2,574,264, granted to Richard S. Hunter November 6, 1951, and it is the general object of the present invention to provide an improved construction for the exposure head component. The improved exposure head eliminates the necessity for providing the diffusion chamber and its inherent light losses disclosed in the said Hunter patent and to that extent has higher sensitivity, and is more simple and economical to manufacture.

The improved exposure head also has an appreciably higher sensitivity in that a greater proportion of the light available from the light source is directed to the sample.

Another advantage of the improved exposure head is that the optical geometry of the light transmission system is such that the sample is illuminated from a plurality of directions (four or more) thus giving equal light intensity to the sample in all directions and affording an average reading over the entire exposed area of the sample. Consequently the sample does not have to be turned to different directions in its holder and the measurements averaged as is necessary in the said Hunter patent. This feature is especially important in that it permits a single averaged measurement of slightly non-uniform samples such as wrinkle finishes and woven materials. In the specific embodiment of the invention which will be described, the sample is illuminated from four different directions spaced 90° apart, each beam of light having an incidence angle of 45°. However, it will be understood that more than four beams can be utilized without departing from the spirit and scope of the invention since the minimum of four will provide all of the advantages.

The increased sensitivity of the improved exposure head, ten fold over that previously available from a single beam, also makes it possible for the first time to measure extremely dark colors below approximately 15% reflectance.

The foregoing and other objects and advantages inherent in the invention will become now apparent from the following detailed description of our practical embodiment of the improved, high-sensitivity exposure head from the accompanying drawings wherein:

Fig. 1 is a top plan view of the interior of the upper chamber of the exposure head with the top cover plate removed;

Fig. 2 is a vertical transverse section taken on line 2—2 of Fig. 1 and with certain components depicted in elevation;

Figure 3:
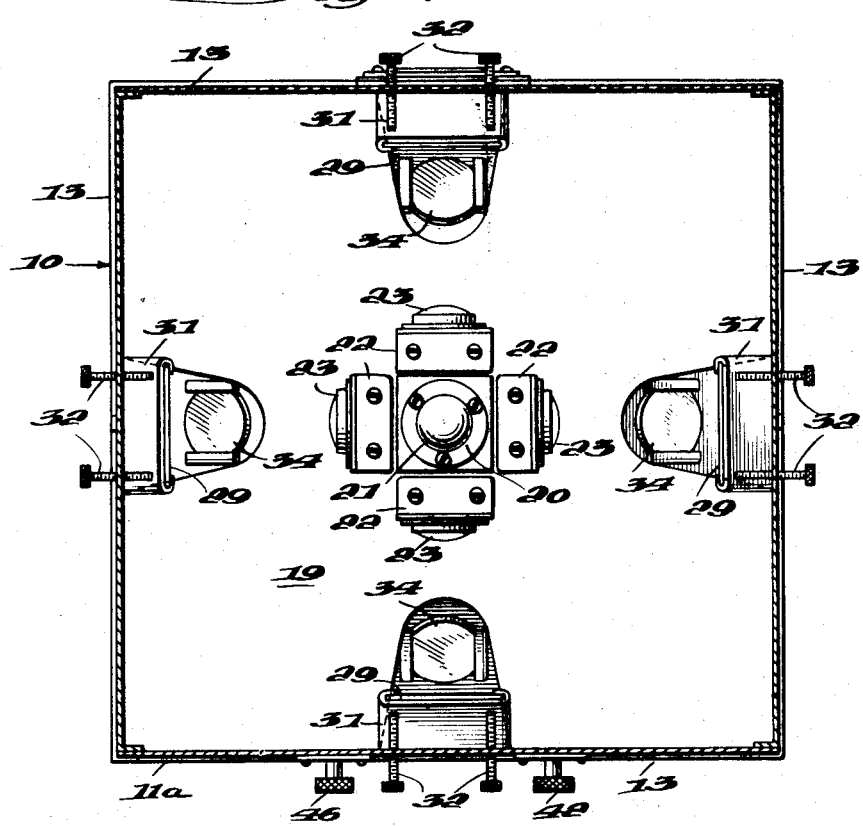
Fig. 3 is a horizontal sectional view showing the interior of the lower chamber of the exposure head and taken on line 3—3 of Fig. 2.

Referring now to the drawings, the exposure head comprises a rectangular housing 10 which is preferably made of sheet metal. The top plate 11 of the housing on which the sample support 12 is centrally located is preferably provided with a depending peripheral flange 11a making a close fit with the side walls 13 and is attached to the latter by easily removable screws 14 so as to facilitate removal and access to the interior of the upper chamber portion 15 of the housing. The bottom plate 16 for the housing which serves as a support base is also peripherally flanged at 16a to overlap the housing side walls 13 and is hinged at 17, 17 to one of the side walls so as to enable the housing to be tilted back about the hinge axis in order to gain access to the lower chamber portion 18 of the housing. As indicated in Fig. 2, the upper and lower chambers 15, 18 of the housing are established by a transverse partition member 19.

Depending from the partition 19 in the lower chamber 18 is a lamp socket 20 adapted to receive the light source 21 which can be a G. E. lamp #1209. Also depending from the partition 19 are four brackets 22 each holding a lens 23 which can be a Simpson Conza 1195. The brackets 22 and lenses 23 are arranged at 90° spacing about a perpendicular axis a—a through the lamp filament so that four beams of light are directed horizontally outward from the lamp 21 at 90° apart.

Another beam of light extending vertically downward along axis a—a falls upon a comparison photocell combination CP, two cells arranged in parallel, which is supported upon a strap 24, one end of which is hingedly connected at 25 to one of the side walls 13. A turn button 26 at the opposite end of strap 24 cooperative with a keeper 27 serves to maintain the strap 24 in its position shown in Fig. 2. However, by first tilting the housing 10 backward on its hinges 17, 17, the strap 24 can then be unlatched and swung about its hinge 25 to provide access to the lamp 21 for replacement.

A heat absorbing filter 28 is placed over the comparison photocell CP between the latter and the beam from lamp 21 and can be adjusted transversely by means not shown to provide an energy-adjusting choke to compensate for drift which may be caused by voltage fluctuation which may affect the light output of the lamp 21 directed onto the comparison photocell component CP. Also, the photocells themselves are subject to fatigue which will change their current output, and changes of temperature and humidity also affect the photocell output. The adjustment of filter 28 enables one to prevent this drift and retain its calibration. The adjustment can be effected manually or automatically.

Each of the four light beams directed generally horizontally outward from lamp 21 is passed through its corresponding lens 23 to a mirror 29 cantilevered at 31 along one side to a side wall 13 of the housing. Two spaced socket head screws 32 protruding through each side wall 13 and threaded through sockets 33 attached to the interior faces of these walls engage the backs of the mirrors 29 to enable the mirrors to provide illumination at an angle of 45°. Each mirror 29 can be chroluminum on glass. Each light beam is projected from its mirror 29 through an aperture 34 in an inclined baffle 35 secured to the side wall 13 and partition 19. These baffles 35 are not absolutely necessary and are inserted only when the optical geometry of the unit must be corrected. If desired, the apertures 34 may be covered by a filter of heat absorbing material. The beams from the four mirrors 29 pass through a central aperture 36 in the top cover plate 11 located along the vertical axis $a$—$a$ and strike the surface of the sample S carried by support 12 preferably at an angle of incidence of 45°. However, the angle of incidence can vary 4° in one direction or the other from 45° and still stay within the specifications published by the ASTM. The diffused light indicative of color is directed downward at an angle of 0°, i. e. perpendicularly to the surface of the test sample, to the test photocell group TP mounted upon the transverse partition wall 19.

The photocells and filters in the test group will be determined by the particular use to which the head is applied. If used to measure reflectance of a surface there will be three photocells in the group TP fitted with green, amber and blue filters respectively. If used to measure brightness, only one photocell with a blue filter is required. If used for measuring color difference, as illustrated, the test photocell group TP comprises one photocell $C_g$ with a green filter for measuring $R_d$ of equation 1 given in the aforesaid U. S. Patent No. 2,574,264; a two photocell group in opposition for the measurement of the value $a$ in equation 2 of said patent, one photocell of this group being cell $C_g$ with the green filter and the other cell $C_{ab}$ having an amber filter and a blue filter in overlapping relationship; and a second two photocell group in opposition for the measurement of the value $b$ in equation 3 of said patent, one photocell of this group being cell $C_g$ with green filter and cell $C_b$ provided with a blue filter.

The diffused light from the sample falling on the photocell $C_{ab}$ passes through a neutral filter plate 38 which is supported horizontally over the photocell upon a slide 39 that is movable back and forth so that the filter 38 will cover more or less of the light reaching the photocell $C_{ab}$. The slide 39 makes threaded engagement with rod 41 extending through the side wall of the housing and hence is moved back and forth by rotating the knob 42 attached to the rod end.

Similarly, the diffused light falling on photocell $C_b$ passes through a neutral filter plate 43, supported horizontally over the photocell upon a slide 44 movable back and forth by means of threaded rod 45 having a knob 46 attached thereto on the exterior of the housing.

The adjustable filter plates 38 and 43 are provided for standardizing purposes and are adjusted whenever necessary during a calibration check of the instrument. If desired, adjustment of these filter plates may be made automatic by means of reversible servo motors coupled to the rods 41 and 45, the circuit arrangement providing a continuous check and driving the servo motors in one direction or the other dependent upon the sense required for correction.

One principal advantage of the present construction is that the test photocell group TP can be moved closer to the sample than heretofore possible thus resulting in a greater amount of light into the photocell. However, the test photocell group cannot be located so close to the sample that it will be affected by specular gloss. Optimum sensitivity and exclusion of specular gloss effect assured if the sensing area of the test photocell group is maintained within 15° of and centered about the axis $a$—$a$.

Figure 4:
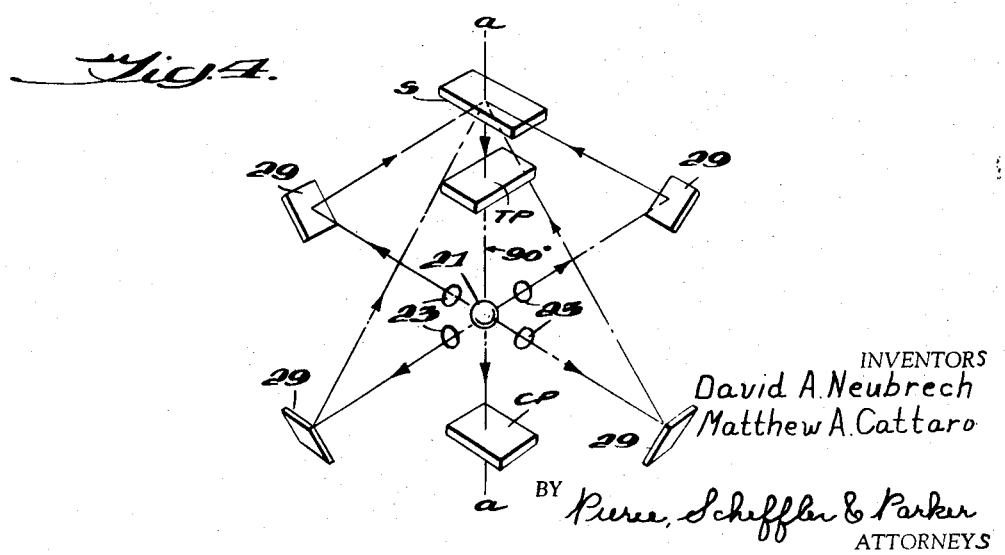
Fig. 4 is a diagrammatic view showing the optical geometry of the improved exposure head.

The optical geometry of the improved head is illustrated diagrammatically in Fig. 4. Thus it will be seen that the sample S, test photocell group TP, light source and comparison photocell CP are interposed along the axis $a$—$a$. Four beams of light from the light source 21 pass generally horizontally in four paths 90° apart, as measured in a plane normal to axis $a$—$a$, through lenses 23 to the inclined mirrors 29, and are reflected upward to strike the surface of the sample S at an angle of incidence equal to 45°. The diffused light is then directed downward along the axis $a$—$a$.

In conclusion it will be understood that while we have described and illustrated one practical embodiment for our improved photometric exposure head, various minor changes in the construction and arrangement of parts may be made without, however, departing from the spirit and scope of the invention as defined in the appended claims.

We claim:

1. In a photometric exposure head the combination comprising a housing, a light source and an exposure aperture arranged in spaced relation along an axis in said housing, test photocell means arranged on said axis between said aperture and said light source, means directing a plurality of at least four beams of light from said light source to said aperture, said light beams being equally spaced about said axis and reaching said aperture at equal angles of incidence for illuminating a sample placed over said aperture equally from all sides and causing diffused light therefrom to be directed along said axis to said test photocell means, comparison photocell means arranged within said housing, and means directing another beam of light from said light source to said comparison photocell means.

2. A photometric exposure head as defined in claim 1 wherein said comparison photocell means is located along said axis and spaced from said light source in the direction away from said test photocell means and said beam of light thereto is directed along said axis.

3. A photometric exposure head as defined in claim 1 wherein said incidence angle is 45°.

4. In a photometric exposure head the combination comprising a rectangular housing, a light source and an exposure aperture arranged in spaced relation along an axis in said housing, said axis being parallel with the four side walls of said housing and said aperture being located in an end wall of said housing, test photocell means arranged on said axis between said aperture and said light source, an inclined mirror arranged within said housing at each side wall, means directing a separate beam of light from said light source to each of said mirrors for reflection to and reaching said exposure aperture at equal angles of incidence for illuminating a sample placed over said aperture equally from all sides and causing diffused light therefrom to be directed along said axis to said test photocell means, comparison photocell means arranged within said housing, and means directing another beam of light from said light source to said comparison photocell means.

5. A photometric exposure head as defined in claim 4 wherein said comparison photocell means is located along said axis and spaced from said light source in the direction away from said test photocell means and said beam of light thereto is directed along said axis.

6. A photometric exposure head as defined in claim 5 and which further includes a plate hinged to one of said walls and latched in place to an opposite side wall, said plate having mounted thereon a support for said comparison photocell means.

7. A photometric exposure head as defined in claim 4 and which includes a partition extending between said side walls intermediate of and parallel with said end walls dividing the interior of said housing into a first chamber containing said test photocell means and a second chamber containing said comparison photocell means and said light source, said partition including mounting means at one side thereof for said test photocell means and at the opposite side thereof a lamp socket for receiving said light source.

8. A photometric exposure head as defined in claim 7 wherein said housing is positioned upright with said axis vertical, said first chamber being disposed above said second chamber, and said end wall closing said second chamber being hinged to an adjacent side wall.

References Cited in the file of this patent
UNITED STATES PATENTS

| | | |
|---|---|---|
| 2,032,128 | Horsfield | Feb. 25, 1936 |
| 2,065,365 | Doyle et al. | Dec. 22, 1936 |
| 2,437,071 | Cahusac et al. | Mar. 2, 1948 |
| 2,574,264 | Hunter | Nov. 6, 1951 |
| 2,739,246 | Hunter | Mar. 20, 1956 |